United States Patent [19]

Kanao

[11] Patent Number: 5,184,649
[45] Date of Patent: Feb. 9, 1993

[54] PRESSURE-RESISTANT HELICAL CORRUGATED PIPE

[76] Inventor: Shiro Kanao, No. 9-18, Nanpeidai 4-chome, Takatsuki-shi, Osaka, Japan

[21] Appl. No.: 697,051

[22] Filed: May 8, 1991

Related U.S. Application Data

[62] Division of Ser. No. 440,066, Nov. 22, 1989, abandoned.

[30] Foreign Application Priority Data

Nov. 26, 1988 [JP] Japan ................................ 63-299337

[51] Int. Cl.⁵ ............................................. F16L 11/11
[52] U.S. Cl. ..................................... 138/122; 138/133; 138/154; 138/174
[58] Field of Search ................ 138/121, 122, 132, 133, 138/134, 135, 172, 174, 143, 144, 173, 154

[56] References Cited

U.S. PATENT DOCUMENTS

| | | | |
|---|---|---|---|
| 1,474,949 | 11/1923 | Sundh | 138/122 |
| 4,759,389 | 7/1988 | Suck | 138/154 |
| 4,796,672 | 1/1989 | Kanao | 138/154 |
| 4,838,317 | 6/1989 | Andre et al. | 138/122 |
| 4,862,924 | 9/1989 | Kanao | 138/154 |
| 5,007,462 | 4/1991 | Kanao | 138/154 |

FOREIGN PATENT DOCUMENTS 473535 10/1937 United Kingdom ................ 138/135

Primary Examiner—James E. Bryant, III
Attorney, Agent, or Firm—Sughrue, Mion, Zinn, Macpeak & Seas

[57] ABSTRACT

A pressure-resistant helically corrugated pipe includes an integral, pipe wall corrugation helically wound to form a pipe, the corrugation having a trough portion disposed close to the axis of the pipe and outwardly projecting flange portions on opposite sides of the trough portion, adjacent flange portions being connected together to form the pipe having a helical outwardly projecting portion adjacent the trough portion. The pipe further includes a metal belt plate reinforcing member disposed within the trough portion of the helically disposed corrugation, the metal belt plate being generally U-shaped in cross-section so as to define a base, legs and free ends and opening toward the exterior of the pipe.

2 Claims, 1 Drawing Sheet

PRESSURE-RESISTANT HELICAL CORRUGATED PIPE

This is a divisional of application Ser. No. 07/440,066 filed Nov. 22, 1989 now abandoned.

BACKGROUND OF THE INVENTION

1. Field of the Invention

The present invention relates to a pressure-resistant helically corrugated pipe intended mainly for underground use. For example, telecommunication cables, such as an electric cable and a telephone cable, are installed in such a corrugated pipe for the purpose of protecting such cables. Also, the corrugated pipe is used as a water main pipe, a sewer pipe, or a liquid transport pipe used in a plant or factory.

2. Background

Among conventional pressure-resistant helically corrugated pipes, the type of corrugated pipes adapted for underground use have been required to be highly pressure-resistant in order to withstand a great ground pressure. For this reason, there have already been manufactured and used underground pressure-resistant pipes of the type in which the pipe wall of a synthetic resin has an increased thickness so as to increase its pressure-resistant ability.

In such a synthetic resin pipe having an increased wall thickness to enhance the pressure resistance, however, a larger amount of synthetic resin is needed because of its increased wall thickness. This not only increases the cost of the material but also increases the weight of the pipe. As a result, the transport and underground installation of the pipe cannot be carried out easily. Further, with respect to the flexibility, although such a pipe is flexible to a certain extent, the radius of curvature of the curved pipe is inevitably large. Thus, the pipe cannot be bent to a small radius of curvature. When it is intended to enhance the flexibility of such a pipe, there has been encountered a problem that the pipe is inferior in pressure-resistance.

Therefore, the present invention seeks to provide a pipe in which the pipe wall is formed using thin metal belt plates in addition to a synthetic resin material or a rubber material. In some cases, the metal belt plates are exposed at the inner surface of the pipe wall. Despite the thin metal belt plates, the problem of flexibility is overcome. Additionally, the amount of the synthetic resin material required is greatly reduced so as to reduce the overall weight of the pipe, and the pipe is excellent in pressure-resistance.

According to the present invention, a pressure-resistant helically corrugated pipe comprises an integral, pipe wall corrugation helically wound to form a pipe, the corrugation having a trough portion disposed close to an axis of the pipe and outwardly projecting flange portions on opposite sides of the trough portion, adjacent flange portions being connected together to form the pipe having a helical outwardly projecting portion adjacent the trough portion. The pipe further includes a metal belt plate reinforcing member disposed within the trough portion of the helically disposed corrugation, the metal belt plate being generally U-shaped in cross-section so as to define a base, legs and free ends and opening toward the exterior of the pipe.

When the pipe of this construction is, for example, to be buried in the ground, a groove is dug in the ground at a required depth at the installation site, and the pipe is installed along the groove. When this pipe is used as a protective pipe for a cable, an electric cable or a telephone cable is passed through the pipe using a lead wire, and then the dug soil is applied to the pipe from above to cover it. In such installation of the pipe, when the pipe is required to be bent with a relatively small radius of curvature because of limitations imposed by geological features and geographical features of the installation site and existing building structures, the pipe of the present invention can be freely flexed to a certain extent since the connective belt region or regions 21 in which the metal belt plates are absent are provided either at the top portions 2 of the pipe wall 1 or at the top portions 2 and the bottom portions 5. Therefore, the pipe 1 can be easily installed without locally concentrating excessive tension and compression on the pipe 1.

DETAILED DESCRIPTION OF THE PREFERRED EMBODIMENT

Figure 1:
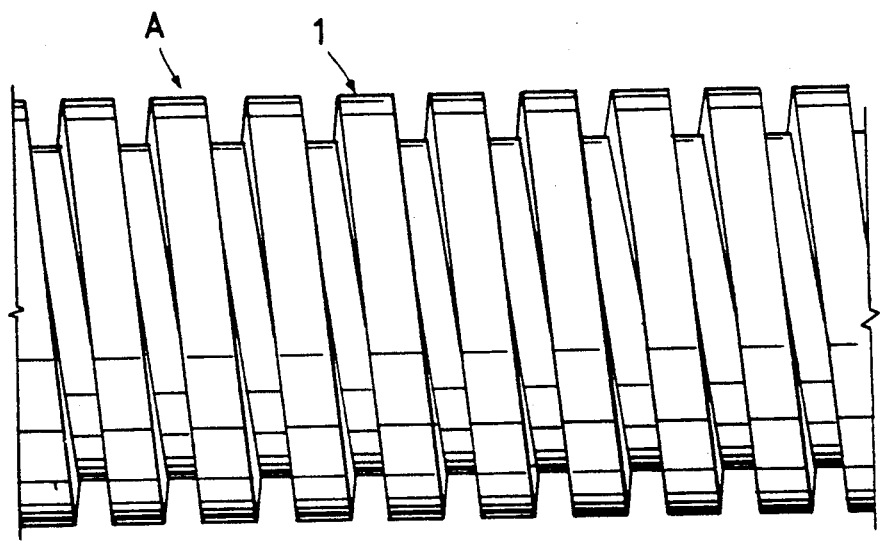
FIG. 1 is a front-elevational view of a pipe according to the invention.

A preferred embodiment of the invention will now be described with reference to the drawing.

Figure 2:
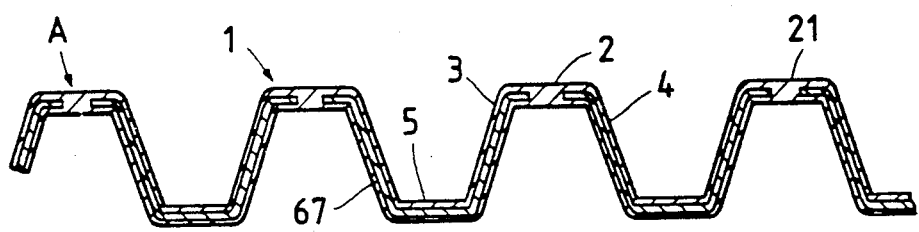
FIGS. 2 and 3 are a longitudinal cross-sectional view and an exploded, cross-sectional view of a pipe according to an embodiment of the invention.
Figure 3:
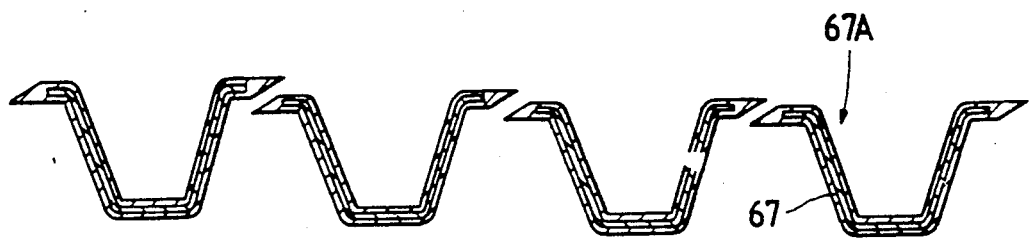

FIGS. 1 to 3 show a preferred embodiment of the invention. A helical corrugated pipe A shown in FIG. 1 includes a pipe wall 1 having a corrugation of a generally U-shaped including opposite side wall portions 3 and 4 (see FIG. 2).

As shown in FIGS. 2 and 3, two kinds of left and right metal belt plates 6 and 7 are joined together at their lower ends or edges to form a one-piece metal belt plate 67 or a generally U-shaped cross-section so as to define a base, legs and free ends and opening toward the exterior of the pipe A. The metal belt plate 67 is molded in a synthetic resin material to form a resin molded belt member 67A. The belt member 67A is helically wound, and its side edge portions (i.e., upper edge portions in the drawings) are integrally fused together to provide a pipe A, shown in FIG. 2, in which the continuous metal belt plate is present in a bottom or trough portion 5 of a pipe wall 1, and a connective belt region 21 in which the metal belt plate is absent is provided at a top or outwardly projecting portion 2 of the pipe wall 1.

Thus, the present invention can be embodied in such a helical corrugated pipe.

As to the material of the metal belt plates 6, 7 and 67 used in the present invention, an iron plate may be used instead of a thin stainless steel plate and a steel plate. Also, a high-strength material of other metal may be used. When forming the above-mentioned perforations (punched holes) through the metal plate, the shape, size and density of such perforations can be suitably determined.

As to the synthetic resin material forming the layers covering the metal belt plates as well as the connective belt regions, a polyolefin, such as polyethylene, polypropylene or the like, and a vinyl chloride can be mainly used, but other synthetic resins may be used. Also, rubber or the rubber-type resin such as synthetic rubber may be used.

While the representative embodiments of the invention have been described herein, the invention itself is not to be restricted to such embodiments, and suitable modifications can be made so long as they have the essential features of the invention, achieve the object of the invention, and achieve the advantageous effects of the invention mentioned below.

As described above in detail in the present invention, the wide thin metal plates are used for forming the pipe wall. two metal belt plates are connected together into a one-piece construction at the bottom portion to assume a U-shape. Thus, the connective belt region made solely of the synthetic resin, in which the metal belt plate is absent, is provided at the top portion of the pipe wall, or such connective belt regions are provided at the top portion and bottom portion of the pipe wall, respectively. With this arrangement, there can be provided a pipe which is pressure-resistant and has a strength withstanding a flattening force.

Therefore, even when the metal belt plates are to be covered with the synthetic resin material over the entire inner and outer surfaces thereof, such covering synthetic resin layers can be considerably reduced in thickness. This achieves such advantages as the reduction of the overall weight of the pipe, easier transport and handling of the pipe, and the reduction of the amount of the synthetic resins to be used. Also, since the connective belt region or regions, in which the metal belt plates are absent, are provided at the top portion the pipe can be flexed. Moreover, because such connective belt region or regions are provided not at the side wall portions but at either the top portion the flexibility of the pipe can be achieved, and therefore when the pipe is to be installed, the pipe can be bent with a relatively small radius of curvature so as to meet variations in geological features and geographical features and to avoid obstacles such as a rock and a building structure, thus achieving such excellent advantages.

I claim:

1. A pressure-resistant helically corrugated pipe, comprising:

an integral, synthetic resin pipe wall corrugation helically wound to form a pipe, said corrugation having a trough portion disposed close to an axis of said pipe and outwardly projecting flange portions on opposing sides of said trough portion, adjacent flange portions being connected together to form said pipe having a helical outwardly projecting portion adjacent said trough portion, said outwardly projecting portion defining a hollow space thereunder; and a metal belt plate reinforcing member disposed within said trough portion of said helically disposed corrugation, said metal belt plate being generally U-shaped in cross-section so as to define a base, legs and free ends and opening toward the exterior of said pipe, said metal belt plate further being completely embedded in said synthetic resin pipe wall so as to be completely surrounded by said synthetic resin pipe wall, wherein said free ends of said metal belt plate project laterally within said outwardly projecting portion in a longitudinal direction of said pipe; further comprising a connective belt region of said synthetic resin pipe wall extending between adjacent free ends of said metal belt plate in said outwardly projecting portion of said pipe.

2. The pipe of claim 1, wherein said metal belt plate is perforated.

* * * * *